May 29, 1951     J. T. MASTERSON     2,554,676
LAWN MOWER SHARPENING MACHINE

Filed Oct. 16, 1946     2 Sheets-Sheet 1

Inventor
Joseph T. Masterson
Andrew F. Wintercorn
Atty

May 29, 1951    J. T. MASTERSON    2,554,676
LAWN MOWER SHARPENING MACHINE
Filed Oct. 16, 1946    2 Sheets-Sheet 2
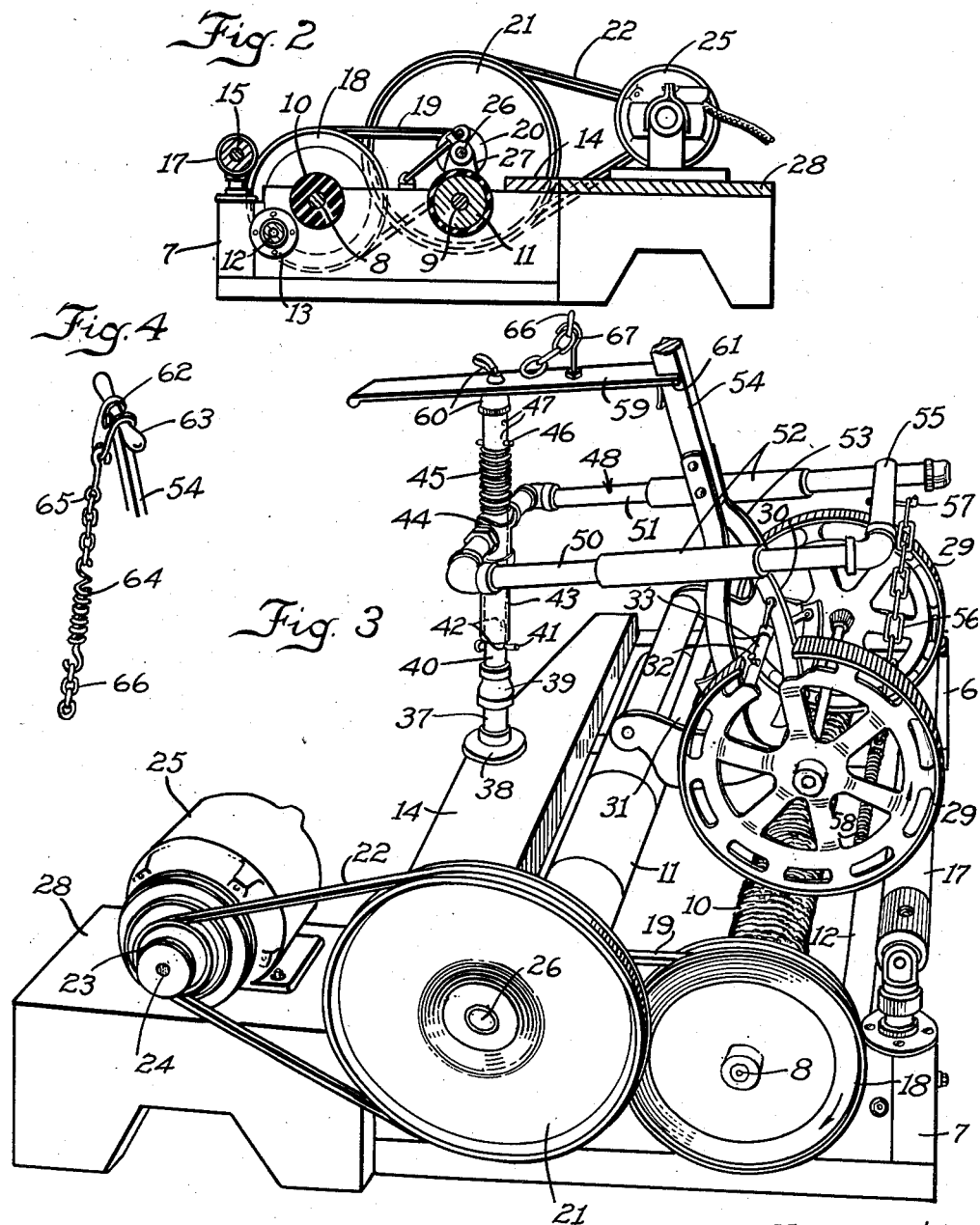
Inventor
Joseph T. Masterson
Andrew F. Wintercorn
Atty Patented May 29, 1951

2,554,676

UNITED STATES PATENT OFFICE 2,554,676

LAWN MOWER SHARPENING MACHINE

Joseph T. Masterson, Clare, Ill.

Application October 16, 1946, Serial No. 703,532

23 Claims. (Cl. 51—26)

This invention relates to lawn mower sharpening machines of the type in which an elevated lawn mower is driven in the reverse direction by frictional drive of its wheels to drive the reel in the reverse direction relative to the cutter bar to sharpen the reel and cutter bar by a sort of lapping operation in which emery paste or other suitable grinding compound is used.

I am aware that a number of machines have been proposed heretofore for driving the reel in the reverse direction relative to the cutter bar, but none of these so far as I am aware was designed to accommodate the lawn mower intact using its wheels for direct frictional drive. In fact, most of the prior machines required the removal of one or both wheels, which consumed a lot of time in the disassemblying and reassembling of the machine which made the sharpening operation costlier, without any advantages being gained whatsoever, particularly in the case of lawn mowers which are equipped with means operable from the centershaft of the reel for reversing the action of the pawls. It is, therefore, the principal object of my invention to provide a lawn mower sharpening machine in which the lawn mower is adapted to be placed with its drive wheels resting in contact with a friction drive roller and against an idler roller in spaced parallel relation to the drive roller, the lawn mower being held down under a certain amount of spring pressure so as to insure good drive and hold the lawn mower as steady as possible throughout the sharpening operation, the drive roller and the one or two idler rollers being both of rubber construction or rubber covered to make for relatively smooth and quiet operation and also eliminate likelihood of too much slippage.

For the relatively light hand mowers a front idler or safety roller is provided above the elevation of and parallel to the drive roller, to keep the mower from running off the machine under the thrust of the drive roller, but for the heavier power mowers, another roller is provided behind and parallel to the drive roller and spaced farther from it than the first mentioned idler roller, because most power mowers have drive wheels of larger radius. The elevated front roller also serves as a safety stop for emergency engagement with the larger drive wheels of a large mower in the event they run forwardly from the rear roller over the driven middle roller during a shapening operation.

A hold-down yoke provided in accordance with my invention is pivotally mounted on a standard on the back portion of the frame of the machine and is arranged to be swung forwardly into operative position over the forked lower end portion of the handle of the lawn mower, whereby to permit the application of spring pressure downwardly on the mower to hold it steady during the sharpening operation, the yoke having spring means cooperating therewith on the standard to yieldingly resist upward movement of its bearing portion relative to the standard, and the yoke having a foldable cross arm on the front end portion thereof to which another spring means is detachably connectible to exert a downward pull on the front end of the yoke in proportion to the amount of spring pressure which it is desired to exert in a downward direction on the mower to hold it steady during the sharpening operation. The yoke bearing and the spring means on the standard are adjustable to different elevations so that the yoke can be used to equal advantage on different makes and styles of hand operated lawn mowers, and the spring means associated with the front end of the yoke also has a quickly adjustable connection with the cross arm. A steady rest is also provided on top of the standard for engagement with the back of the handle of the mower and on this steady rest I preferably provide a hook so that, if desired, a claw may be attached to the cross bar on the upper end of the handle and connected through a tension spring with the steady rest to further insure steadying the mower during the sharpening operation.

The invention is illustrated in the accompanying drawing, in which

Fig. 2 is a cross-section on the line 2—2 of Fig. 1;

Fig. 3 is a perspective view of the machine from the motor drive end showing a hand operated lawn mower in position thereon for sharpening, the upper portion of the handle of the lawn mower being broken away to permit showing the machine on a larger scale;

Fig. 4 is a perspective view of the auxiliary hold-down claw and its chain and spring connecting means usable in a set-up like Fig. 3.

The same reference numerals are applied to corresponding parts throughout the views.

Figure 1:
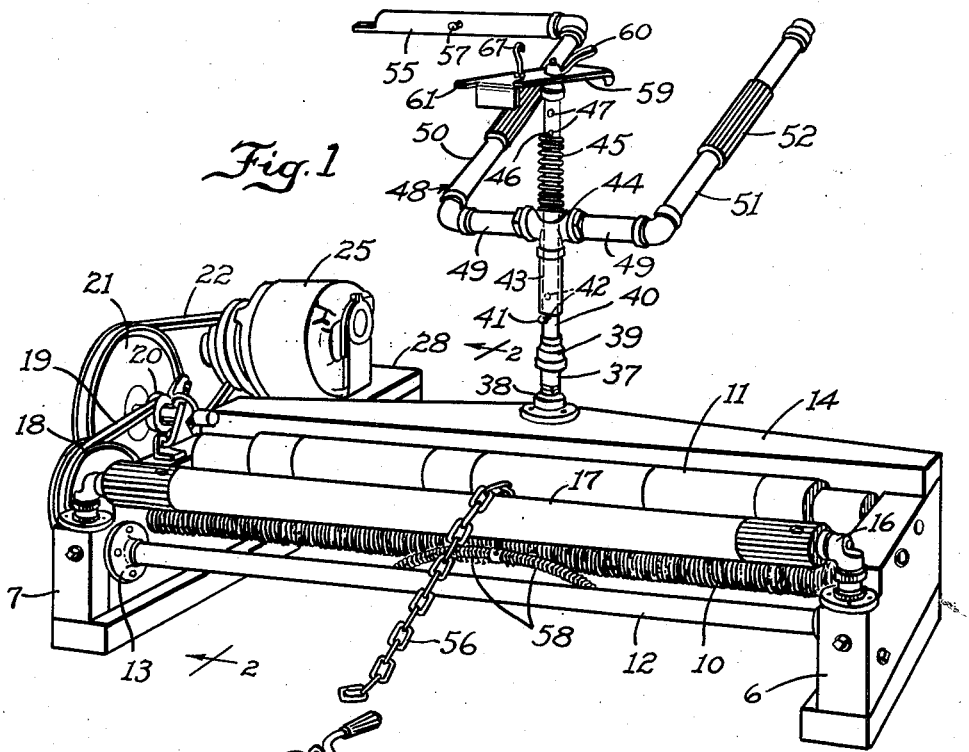
Fig. 1 is a perspective view of a lawn mower sharpening machine made in accordance with my invention.

Referring first to Figs. 1 and 2, the reference numerals 6 and 7 designate end frames made of hard wood in which holes are drilled accurately to form bearings for shafts 8 and 9, shaft 8 carrying rubber disks made from the side walls of discarded automobile tires to form a highly durable friction drive roller 10, and shaft 9 carrying a wooden spool covered with rubber to form an idler roller 11 in rearwardly spaced parallel relation to the drive roller 10. A cross bar 12 rigidly secured at its ends to the front end of the end frames, as indicated at 13, and a wooden cross piece 14 fastened at its ends to the rear ends of the end frames cooperate to form a rigid frame structure. Another shaft 15 received in bearings 16 mounted on top of the front ends of the end frames carries a wooden spool with a rubber covering forming another idler roller 17 in forwardly and upwardly spaced parallel relation to the drive roller 10. The drive roller 10 is driven by means of a pulley 18 fixed on the projecting end of the shaft 8, a belt 19 being extended from this pulley 18 to a smaller pulley 20 which in turn is driven with a large pulley 21 that has a belt 22 extending around it and around a small pulley 23 on the armature shaft 24 of the electric motor 25, whereby a two-stage speed reduction is obtained between the motor 25 and the drive roller 10. The pulleys 20 and 21 are suitably supported on a shaft 26 carried on a support 27 mounted on the end frame 7, and the motor 25 is carried on a small bench 28 disposed behind and suitably secured to the end frame 7. The roller 17 is disposed closer to the drive roller 10 than the roller 11 and cooperates with the drive roller 10 to drive the wheels 29 of a hand operated lawn mower in the manner illustrated in Fig. 3, the roller 10 turning in a clockwise direction, as indicated by the arrows on the pulleys 18 and 21, so as to turn the wheels 29 in a clockwise direction, as indicated by the arrows, and accordingly drive the reel 30 in the reverse direction relative to the cutter bar 31. The elevated front roller 17 also serves as a safety stop for emergency engagement with the larger drive wheels 35 of a large mower 34 in the event they run forwardly from the rear roller 11 over the driven middle roller 10 during a sharpening operation. The lawn mower illustrated in Fig. 3 is of the type in which a lever 32 projects through a slot in the tubular shaft 33 of the reel 30 to permit reversing the action of the drive pawls so that the reel 30 can be driven in the reverse direction when the control lever 32 has been shifted to the appropriate end of the slot. Under normal operating conditions, the control lever 32 is at the other end of the slot for forward drive of the reel with forward or clockwise rotation of the wheels 29, the wheels 29 being arranged to turn idly in the reverse direction. With mowers of this construction, it is obviously a simple matter to reverse the pawl action for the purpose of sharpening the mower. With others it is necessary to remove at least one of the drive wheels so as to afford access to at least one of the drive pinions and reverse the pawl thereof so as to prevent its free wheeling in reverse drive. In any event, it is obvious that the sharpening of a lawn mower is greatly facilitated when the drive wheels of the mower are used in the manner herein disclosed, instead of dismantling the mower to a greater or lesser extent and fixing the frame of the mower and making suitable drive connections between a drive means and the reel shaft, because so many extra operations are involved in this other procedure without any advantages being gained, and the cost of the sharpening job is needlessly increased.

The other idler roller 11 is spaced farther from the drive roller 10 than the roller 17 to accommodate the larger wheels on some lawn mowers. For example, in Fig. 5 a power operated lawn mower is illustrated at 34 having its drive wheels resting on the rollers 10 and 11 for drive of the reel 36 of this mower in the reverse direction relative to its cutter bar, as indicated by the arrow on the wheel 35 in the forefront. The wheels on power mowers are usually as large or larger than the largest wheels used on hand operated mowers, and, therefore, the wider spacing of the roller 11 with respect to the drive roller 10 makes the present machine adaptable to use with all makes and styles of lawn mowers.

Figure 5:
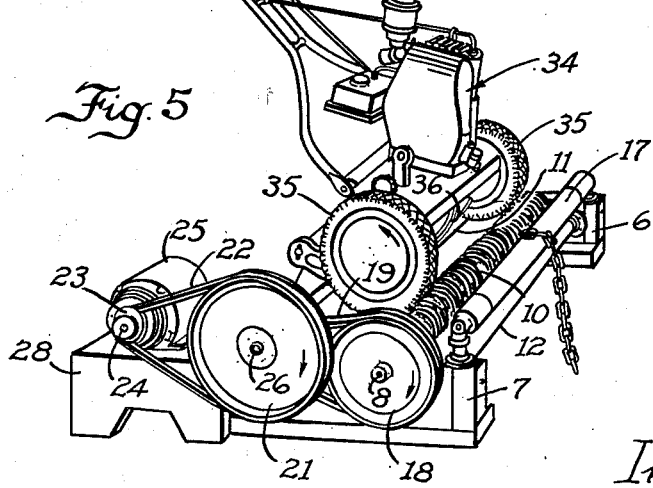
Fig. 5 is a perspective view on a smaller scale similar to Fig. 3, but showing a power mower in position on the machine for sharpening.

Power lawn mowers are usually heavy enough so that no hold-down means is needed to hold the mower steady during the sharpening operation (see Fig. 5). However, hand operated lawn mowers are usually much lighter and a hold-down means is therefore necessary in the sharpening of such mowers, as illustrated in Fig. 3. Referring to Figs. 1 and 3 and also to some extent to Fig. 4, a nipple 37 is threaded in a fitting 38 fastened on top of the rear cross piece 14 substantially at the middle and has a fitting 39 threaded detachably on the upper end thereof for support of a vertical standard 40. A pin 41 is entered in either one of two vertically spaced holes 42 provided in the standard to serve as an abutment for a sleeve 43 which is slidable up and down on the standard. A T-fitting 44 is provided on the upper end of the sleeve 43 and has the lower end of a coiled compression spring 45 bearing thereon, the upper end of the spring being confined by a cross pin 46 which is entered in either one of two vertically spaced holes 47 provided in the upper end portion of the standard. Now, a yoke 48 of rectangular form is pivotally mounted on the T-fitting 44, the rear portion being formed by two coaxially aligned arms 49 extending from the opposite sides of the T-fitting 44, and the parallel side portions 50 and 51 being connected to the outer ends of the arms 49 and having rubber sleeves 52 provided thereon intermediate the ends thereof for non-slip non-marring contact with the forked lower end portion 53 of the lawn mower handle 54. A cross arm 55 is pivoted on the outer end of the arm 50 and is arranged to be folded inwardly over the top of the arm 51, as indicated in Fig. 3, when a chain 56 is to be hooked onto the projecting pin 57 provided on the middle portion of the arm 55 to apply the downward pull of a pair of tension springs 58 which are attached to the cross bar 12 at their outer ends and to the lower end of the chain 56 at their inner ends. Obviously, the operator can increase the downward pressure on the yoke 48 to whatever extent seems advisable, by attaching the appropriate link of the chain 56 to the pin 57, pressure being estimated roughly by upward pull on the chain 56 preliminary to connection of the chain with the pin. Obviously, the downward pull on the front of the yoke 48 tends to rock the yoke on the fork 53, and the sleeve 43 is accordingly raised off the pin 41 against the resistance of the spring 45, and in that way there is a balanced spring pressure exerted in a downward direction on the lawn mower by the springs 45 and 58 to hold the mower steady during the sharpening operation.

A bracket 59 is mounted on the upper end of the standard 40, as indicated at 60 and has a forked front end portion 61 in which the handle 54 of the lawn mower is received so as to hold the frame of the lawn mower tilted forwardly to the extent illustrated in Fig. 3 during the sharpening operation and cooperate with the yoke 48 in holding the mower steady during the sharpening operation. If desired, a claw 62 can be applied to the cross bar 63 on the upper end of the handle 54, as illustrated in Fig. 4, so as to exert a further hold-down spring pressure on the mower, there being a coiled tension spring 64 connected at one end by means of a chain 65 to the claw 62, the other end of the spring being connected to another chain 66 which, as indicated in Fig. 3, is arranged to be attached to a hook 67 provided on the bracket 59, the desired tension being applied by suitable adjustment of the chain 66 with respect to the hook 67, similarly as in the tensioning of the spring 58 by means of the chain 56.

In operation, a lawn mower can be quickly and easily sharpened with the present machine using emery paste or other grinding compounds on the blades of the reel of the mower and driving the reel in the reverse direction relative to the cutter bar, the operator making whatever adjustments are necessary on the cutter bar at the outset and such further adjustments as he may deem necessary during the progress of the sharpening operation. The rubber drive roller 10 insures good traction, as well as quiet operation, and rubber covering on the idler rollers 11 and 17 make the operation relatively quiet and enable the operator to judge fairly accurately from the sound of the operation of the mower when the sharpening operation is completed, thereby reducing needless power consumption and shortening the operation all around and avoiding unnecessary wearing away of the parts of the mower.

It is believed the foregoing description conveys a good understanding of the objects and advantages of my invention. The appended claims have been drawn to cover all legitimate modifications and adaptations.

I claim:

1. In a machine for sharpening lawn mowers by rotation of the mower's drive wheels so as to rotate the mower's reel relative to the mower's cutter bar, a frame, a pair of rollers mounted therein for rotation in spaced parallel relation and adapted to support a lawn mower by engagement with its drive wheels, at least one of said rollers being a driven roller whereby to transmit drive to the mower's wheels, and means for driving said driven roller, a yoke floatingly mounted on a support provided therefor on said frame and arranged to rest on top of said mower to apply pressure downwardly thereon to secure steady engagement of the mower's wheels on said rollers, and spring means connecting the frame and said yoke fore and aft relative to the mower to hold the mower down under spring pressure so that the wheels thereof are held in steady engagement with the rollers.

2. In a machine for sharpening lawn mowers by rotation of the mower's drive wheels so as to rotate the mower's reel relative to the mower's cutter bar, a frame, a pair of rollers mounted therein for rotation in spaced parallel relation and adapted to support a lawn mower by engagement with its drive wheels, at least one of said rollers being a driven roller whereby to transmit drive to the mower's wheels, and means for driving said driven roller, a yoke floatingly mounted on a support provided therefor on said frame and arranged to rest on top of said mower to apply pressure downwardly thereon to secure steady engagement of the mower's wheels on said rollers, and spring means connecting the frame and said yoke fore and aft relative to the mower to hold the mower down under spring pressure so that the wheels thereof are held in steady engagement with the rollers, a steady rest for the upwardly projecting handle of the mower, and auxiliary spring means connecting said handle and said frame to hold the mower down under spring pressure.

3. In a machine for sharpening lawn mowers by rotation of the mower's drive wheels so as to rotate the mower's reel relative to the mower's cutter-bar, a frame, a pair of rollers mounted therein for rotation in spaced parallel relation and adapted to support a lawn mower by engagement with its drive wheels, at least one of said rollers being a driven roller whereby to transmit drive to the mower's wheels, and means for driving said driven roller, a yoke pivoted to said frame behind said rollers and designed to rest on top of said mower to apply pressure downwardly thereon to secure steady engagement of the mower's wheels on said rollers, and tension spring means on said frame in front of said rollers detachably and adjustably connectible with said yoke to pull the same downwardly to apply a selected pressure on the mower.

4. A machine as set forth in claim 3, wherein the yoke in addition to being pivoted relative to said frame behind said rollers is slidable upwardly relative to said frame, said machine including compression spring means mounted on said frame behind said rollers to resist upward movement of said yoke.

5. A machine as set forth in claim 3, wherein the yoke in addition to being pivoted relative to said frame behind said rollers is slidable upwardly relative to said frame, said machine including compression spring means mounted on said frame behind said rollers to resist upward movement of said yoke, and verticallly adjustable upper and lower abutments for said yoke, said compression spring means on said frame permitting placement of the yoke at different selected elevations with respect to said frame.

6. In a machine for sharpening lawn mowers by rotation of the mower's drive wheels so as to rotate the mower's reel relative to the mower's cutter-bar, a frame, a pair of rollers mounted therein for rotation in spaced parallel relation and adapted to support a lawn mower by engagement with its drive wheels, at least one of said rollers being a driven roller whereby to transmit drive to the mower's wheels, and means for driving said driven roller, a yoke pivoted to said frame behind said rollers and arranged to rest on top of said mower to apply pressure downwardly thereon to secure steady engagement of the mower's wheels on said rollers, tension spring means on said frame in front of said rollers detachably and adjustably connectible with said yoke to pull the same downwardly to apply a selected pressure on the mower, a rest on said frame behind said rollers for the handle of the mower, and other tension spring means on said frame behind said rollers detachably and adjustably connectible with the handle of the mower to hold it in contact with the rest and exert a selected downward pull on said handle, whereby further to insure steady engagement of the mower's wheels on said rollers.

7. In a machine for sharpening lawn mowers by rotation of the mower's two drive wheels so as to rotate the mower's reel relative to the mower's cutter bar in the reverse from the grass cutting direction, a frame, a pair of elongated rollers mounted horizontally therein for rotation in spaced parallel relation and adapted jointly to support a lawn mower positioned on said machine by engagement with its drive wheels while the mower is disposed in a substantially normal operating position, one of said rollers being a driven roller whereby to transmit drive to the mower's wheels, the other roller being spaced in front of and at an appreciably higher elevation than the driven roller to keep the lawn mower from running off the machine under the thrust of the driven roller, and power operated means for driving said driven roller in the appropriate direction to secure the reverse from the normal direction of rotation of the mower's wheels.

8. In a machine for sharpening lawn mowers by rotation of the mower's two drive wheels so as to rotate the mower's reel relative to the mower's cutter bar in the reverse from the grass cutting direction, a frame, a pair of elongated rollers mounted horizontally therein for rotation in spaced parallel relation and adapted jointly to support a lawn mower positioned on said machine by engagement with its drive wheels while the mower is disposed in a substantially normal operating position, one of said rollers being a driven roller whereby to transmit drive to the mower's wheels, the other roller being spaced in front of and at an appreciably higher elevation than the driven roller to keep the lawn mower from running off the machine under the thrust of the driven roller, power operated means for driving said driven roller in the appropriate direction to secure the reverse from the normal direction of rotation of the mower's wheels, and a steady rest on said frame for the upwardly projecting handle of the mower disposed behind and above the driven roller.

9. In a machine for sharpening lawn mowers by rotation of the mower's two drive wheels so as to rotate the mower's reel relative to the mower's cutter bar in the reverse from the grass cutting direction, a frame, a pair of elongated rollers mounted horizontally therein for rotation in spaced parallel relation and adapted jointly to support a lawn mower positioned on said machine by engagement with its drive wheels while the mower is disposed in a substantially normal operating position, one of said rollers being a driven roller whereby to transmit drive to the mower's wheels, the other roller being spaced in front of and at an appreciably higher elevation than the driven roller to keep the lawn mower from running off the machine under the thrust of the driven roller, power operated means for driving said driven roller in the appropriate direction to secure the reverse from the normal direction of rotation of the mower's wheels, a steady rest on said frame for the upwardly projecting handle of the mower disposed behind and above the driven roller, and mower hold-down means connected with said frame for yieldingly maintaining steady engagement between the mower's wheels and said rollers.

10. In a machine for sharpening lawn mowers by rotation of the mower's two drive wheels so as to rotate the mower's reel relative to the mower's cutter bar in the reverse from the grass cutting direction, a frame, a pair of elongated rollers mounted horizontally therein for rotation in spaced parallel relation and adapted jointly to support a lawn mower positioned on said machine by engagement with its drive wheels while the mower is disposed in a substantially normal operating position, one of said rollers being a driven roller whereby to transmit drive to the mower's wheels, the other roller being spaced in front of and at an appreciably higher elevation than the driven roller to keep the lawn mower from running off the machine under the thrust of the driven roller, power operated means for driving said driven roller in the appropriate direction to secure the reverse from the normal direction of rotation of the mower's wheels, and mower hold-down means connected with said frame for yieldingly maintaining steady engagement between the mower's wheels and said rollers.

11. A machine for sharpening lawn mowers of the manually operated push type by rotation of the mower's two drive wheels so as to rotate the mower's reel relative to the mower's cutter-bar in the reverse from the grass cutting direction, each mower having an elongated handle extending upwardly from the mower carrying a fork on its lower end connected to said mower, said machine comprising a frame, a pair of elongated rollers mounted horizontally in said frame for rotation in spaced parallel relation and adapted jointly to support a lawn mower positioned on said machine by engagement with its drive wheels while the mower is disposed in a substantially normal operating position, one of said rollers being a driven roller whereby to transmit drive to the mower's wheels, the other roller being spaced in front of and at an appreciably higher elevation than the driven roller to keep the lawn mower from running off the machine under the thrust of the driven roller, power operated means for driving said driven roller in the appropriate direction to secure the reverse from the normal direction of rotation of the mower's wheels, and mower hold-down means connected with said frame arranged to engage on top of said handle fork on opposite sides of said handle for maintaining steady engagement between the mower's wheels and said rollers.

12. A machine for sharpening lawn mowers of the manually operated push type by rotation of the mower's two drive wheels so as to rotate the mower's reel relative to the mower's cutter bar in the reverse from the grass cutting direction, each mower having an elongated handle extending upwardly from the mower carrying a fork on its lower end connected to said mower, said machine comprising a frame, a pair of elongated rollers mounted horizontally in said frame for rotation in spaced parallel relation and adapted jointly to support a lawn mower positioned on said machine by engagement with its drive wheels while the mower is disposed in a substantially normal operating position, one of said rollers being a driven roller whereby to transmit drive to the mower's wheels, the other roller being spaced in front of and at an appreciably higher elevation than the driven roller to keep the lawn mower from running off the machine under the thrust of the driven roller, power operated means for driving said driven roller in the appropriate direction to secure the reverse from the normal direction of rotation of the mower's wheels, a steady rest on said frame for said mower handle disposed behind and above the driven roller, and mower hold-down means connected with said frame arranged to engage on top of said handle fork on opposite sides of said handle for maintaining steady engagement between the mower's wheels and said rollers.

13. A machine for sharpening lawn mowers of the manually operated push type by rotation of the mower's two drive wheels so as to rotate the mower's reel relative to the mower's cutter bar, each mower having an elongated handle extending upwardly from the mower carrying a crossbar on its upper end and a fork on its lower end connected to said mower, said machine comprising a frame, a pair of elongated rollers mounted horizontally in said frame for rotation in spaced parallel relation and adapted jointly to support a lawn mower positioned on said machine by engagement with its drive wheels, one of said rollers being a driven roller whereby to transmit drive to the mower's wheels, the other roller being spaced in front of and at an appreciably higher elevation than the driven roller to keep the lawn mower from running off the machine under the thrust of the driven roller, means for driving said driven roller, a steady rest on said frame for said mower handle disposed behind and above the driven roller, mower hold-down means connected with said frame arranged to engage on top of said handle fork on opposite sides of said handle for maintaining steady engagement between the mower's wheels and said rollers, and auxiliary mower hold-down means extending from said steady rest to engagement with the cross-bar on the upper end of said handle.

14. A machine for sharpening lawn mowers of the manually operated push type by rotation of the mower's two drive wheels so as to rotate the mower's reel relative to the mower' cutter bar, each mower having an elongated handle extending upwardly from the mower carrying a fork on its lower end connected to said mower, said machine comprising a frame, a pair of elongated rollers mounted horizontally in said frame for rotation in spaced parallel relation and adapted jointly to support a lawn mower positioned on said machine by engagement with its drive wheels, one of said rollers being a driven roller whereby to transmit drive to the mower's wheels, the other roller being spaced in front of and at an appreciably higher elevation than the driven roller to keep the lawn mower from running off the machine under the thrust of the driven roller, means for driving said driven roller, a yoke pivoted with respect to said frame to swing down onto the top of said handle fork to apply pressure downwardly on the mower to secure steady engagement of the mower's wheels on said rollers, and spring means acting between the frame and said yoke to hold the mower down under spring pressure so that the wheels thereof are held in steady engagement with the rollers.

15. A machine for sharpening lawn mowers of the manually operated push type by rotation of the mower's two drive wheels so as to rotate the mower's reel relative to the mower's cutter-bar, each mower having an elongated handle extending upwardly from the mower carrying a crossbar on its upper end and a fork on its lower end connected to said mower, said machine comprising a frame, a pair of elongated rollers mounted horizontally in said frame for rotation in spaced parallel relation and adapted jointly to support a lawn mower positioned on said machine by engagement with its drive wheels, one of said rollers being a driven roller whereby to transmit drive to the mower's wheels, the other roller being spaced in front of and at an appreciably higher elevation than the driven roller to keep the lawn mower from running off the machine under the thrust of the driven roller, means for driving said driven roller, a yoke floatingly mounted on a support provided therefor on said frame and arranged to rest on top of said handle fork to apply pressure downwardly on the mower to secure steady engagement of the mower's wheels on said rollers, spring means acting between the frame and said yoke fore and aft relative to the mower to hold the mower down under spring pressure so that the wheels thereof are held in steady engagement with the rollers, a steady rest for said handle provided on the support and disposed behind and above the driven roller, and auxiliary spring means acting between the crossbar on the upper end of said handle and said frame to hold the mower down under spring pressure.

16. In a machine for sharpening lawn mowers by rotation of the mower's two drive wheels so as to rotate the mower's reel relative to the mower's cutter-bar in the reverse from the grass cutting direction, a frame, an elongated friction drive roller rotatably mounted horizontally in said frame, power operated means for driving the roller in the appropriate direction to secure the reverse from the normal direction of rotation of the mower's wheels, and a pair of other elongated rollers rotatably mounted horizontally in said frame in parallel relation to the drive roller in front of and behind the same, either of which is adapted to cooperate with said drive roller jointly to support a lawn mower positioned on said machine by engagement with the drive wheels thereof while the drive roller transmits drive to the mower's wheels, the rear roller being in substantially the same horizontal plane with and spaced farther from the drive roller for support of the relatively large drive wheels of a larger and relatively heavy mower during the sharpening operation, and the front roller being in closer spaced relation to and at an appreciably higher elevation than the driven roller for support of the smaller drive wheels of a smaller and lighter mower during the sharpening operation and to keep the same from running off the machine under the thrust of the driven roller, the elevated front roller also serving as a safety stop for emergency engagement with the relatively large drive wheels of a large mower in the event they run forwardly from the rear roller over the driven roller during a sharpening operation.

17. In a machine for sharpening lawn mowers by rotation of the mower's two drive wheels so as to rotate the mower's reel relative to the mower's cutter-bar, a frame, an elongated friction drive roller rotatably mounted horizontally in said frame, power operated means for driving the roller, and a pair of secondary elongated rollers rotatably mounted horizontally in said frame in parallel relation to the drive roller in front of and behind the same, either of which is adapted to cooperate with said drive roller jointly to support a lawn mower positioned on said machine by engagement with the drive wheels thereof while the drive roller transmits drive to the mower's wheels, one of said secondary rollers being in relatively widely spaced relation to the drive roller for support and drive of relatively large mower wheels therebetween, and the other of said secondary rollers being in relatively closely spaced but elevated relation to the drive roller for support and drive of relatively small mower wheels therebetween, the elevated secondary roller also serving as a safety stop for emergency engagement with the relatively large drive wheels of a large mower in the event they run over the driven roller away from the other secondary roller during a sharpening operation.

18. In a machine for sharpening lawn mowers by rotation of the mower's two drive wheels so as to rotate the mower's reel relative to the mower's cutter-bar in the reverse from the grass cutting direction, a frame, an elongated friction drive roller rotatably mounted horizontally in said frame, power operated means for driving the roller in the appropriate direction to secure the reverse from the normal direction of rotation of the mower's wheels, and a pair of other elongated rollers rotatably mounted horizontally in said frame in parallel relation to the drive roller in front of and behind the same, either of which is adapted to cooperate with said drive roller to jointly support a lawn mower positioned on said machine by engagement with the drive wheels thereof while the drive roller transmits drive to the mower's wheels, the rear roller being in substantially the same horizontal plane with and spaced farther from the drive roller for support of the relatively large drive wheels of a larger and relatively heavy mower during the sharpening operation, and the front roller being in closer spaced relation to and at an appreciably higher elevation than the driven roller for support of the smaller drive wheels of a smaller and lighter mower during the sharpening operation and to keep the same from running off the machine under the thrust of the driven roller, the elevated front roller also serving as a safety stop for emergency engagement with the relatively large drive wheels of a large mower in the event they run forwardly from the rear roller over the driven roller during a sharpening operation, said rollers having at least the wheel engaging portions thereof of sound deadening material, whereby to reduce the noise incidental to driving the mower so that the progress of the sharpening operation can be checked by the noise incidental to the turning of the mower's reel relative to the mower's cutter bar.

19. In a machine for sharpening lawn mowers by rotation of the mower's two drive wheels so as to rotate the mower's reel relative to the mower's cutter bar, a frame, an elongated friction drive roller rotatably mounted horizontally in said frame, means for driving the roller, and a pair of other elongated rollers rotatably mounted horizontally in said frame in parallel relation to the drive roller in front of and behind the same, either of which is adapted to cooperate with said drive roller jointly to support a lawn mower positioned on said machine by engagement with the drive wheels thereof while the drive roller transmits drive to the mower's wheels, the rear roller being in substantially the same horizontal plane with and spaced farther from the drive roller for support of the relatively large drive wheels of a larger and relatively heavy mower during the sharpening operation, and the front roller being in closer spaced relation to and at an appreciably higher elevation than the driven roller for support of the smaller drive wheels of a smaller and lighter mower during the sharpening operation and to keep the same from running off the machine under the trust of the driven roller, the elevated front roller also serving as a safety stop for emergency engagement with the relatively large drive wheels of a large mower in the event they run forwardly from the rear roller over the driven roller during a sharpening operation, a yoke floatingly mounted on a support provided therefor on said frame and arranged to rest on top of said mower to apply pressure downwardly thereon to secure steady engagement of the mower's wheels on said drive roller, and spring means connecting the frame and said yoke fore and aft relative to the mower to hold the mower down under spring pressure.

20. In a machine for sharpening lawn mowers of the manually operated push type by rotation of the mower's two drive wheels so as to rotate the mower's reel relative to the mower's cutter-bar, each mower having an elongated handle extending upwardly therefrom, said machine comprising a frame, an elongated friction drive roller rotatably mounted horizontally in said frame, means for driving the roller, and a pair of other elongated rollers rotatably mounted horizontally in said frame in parallel relation to the drive roller in front of and behind the same, either of which is adapted to cooperate with said drive roller jointly to support a lawn mower positioned on said machine by engagement with the drive wheels thereof while the drive roller transmits drive to the mower's wheels, the rear roller being in substantially the same horizontal plane with and spaced farther from the drive roller for support of the relatively large drive wheels of a larger and relatively heavy mower during the sharpening operation, and the front roller being in closer spaced relation to and at an appreciably higher elevation than the driven roller for support of the smaller drive wheels of a smaller and lighter mower during the sharpening operation and to keep the same from running off the machine under the thrust of the driven roller, the elevated front roller also serving as a safety stop for emergency engagement with the relatively large drive wheels of a large mower in the event they run forwardly from the rear roller over the driven roller during a sharpening operation, a yoke floatingly mounted on a support provided therefor on said frame and arranged to rest on top of said mower to apply pressure downwardly thereon to secure steady engagement of the mower's wheels on said drive roller, spring means connecting the machine frame and said yoke fore and aft relative to the mower to hold the mower down under spring pressure, a steady rest for said mower handle on the support, and auxiliary spring means connecting said handle and said frame further to hold the mower down under spring pressure.

21. A machine for sharpening lawn mowers of the manually operated push type by rotation of the mower's two drive wheels so as to rotate the mower's reel relative to the mower's cutter-bar, each mower having an elongated handle extending upwardly from the mower carrying a fork on its lower end connected to said mower, said machine comprising a frame, a pair of elongated rollers mounted horizontally in said frame for rotation in spaced parallel relation and adapted jointly to support a lawn mower positioned on said machine by engagement with its drive wheels, one of said rollers being a driven roller whereby to transmit drive to the mower's wheels, the other roller being spaced in front of and at an appreciably higher elevation than the driven roller to keep the lawn mower from running off the machine under the thrust of the driven roller, means for driving said driven roller, an upright standard on the frame, a support slidable upwardly on said standard against resistance of a spring means, a yoke pivoted on said support and designed to swing downwardly onto the top of the handle fork, and spring means acting between the free end of said yoke and said frame to hold the mower down under the joint spring pressure of the two spring means so that the mower's wheels are held in steady engagement with the rollers.

22. A machine as set forth in claim 21 including vertically adjustable upper and lower abutments for said first named spring means and said slidable support on said standard, whereby said yoke may be placed at different elevations in substantially horizontal planes of operation to cooperate with different lawn mowers.

23. A machine for sharpening lawn mowers of the manually operated push type by rotation of the mower's two drive wheels so as to rotate the mower's reel relative to the mower's cutter-bar, each mower having an elongated handle extending upwardly from the mower carrying a fork on its lower end connected to said mower, said machine comprising a frame, a pair of elongated rollers mounted horizontally in said frame for rotation in spaced parallel relation and adapted jointly to support a lawn mower positioned on said machine by engagement with its drive wheels, one of said rollers being a driven roller whereby to transmit drive to the mower's wheels, the other roller being spaced in front of and at an appreciably higher elevation than the driven roller to keep the lawn mower from running off the machine under the thrust of the driven roller, means for driving said driven roller, an upright standard on the frame, a support slidable upwardly on said standard against resistance of a spring means, a bifurcated yoke pivoted on said support and designed to swing downwardly onto the top of the handle fork to engage the fork on opposite sides of the handle, a cross arm pivoted to the free end portion of one of the arms of the forked yoke and movable onto the top of the free end portion of the other arm of said yoke, and spring means acting between said cross arm and said frame to hold the mower down under the joint spring pressure of the two spring means so that the mower's wheels are held in steady engagement with the rollers.

JOSEPH T. MASTERSON.

REFERENCES CITED

The following references are of record in the file of this patent:

UNITED STATES PATENTS

| Number | Name | Date |
|---|---|---|
| 960,447 | Tyden | June 7, 1910 |
| 1,484,708 | Grassman | Feb. 26, 1924 |
| 1,513,276 | Royer | Oct. 28, 1924 |
| 1,561,181 | Morgan | Nov. 10, 1925 |
| 1,612,219 | Powers | Dec. 28, 1926 |
| 1,807,934 | Ross | June 2, 1931 |
| 2,110,637 | Simmons | Mar. 8, 1938 |
| 2,149,774 | Ingleman | Mar. 7, 1939 |
| 2,195,049 | Wallace | Mar. 26, 1940 |